(12) United States Patent
Dahl et al.

(10) Patent No.: US 9,464,237 B2
(45) Date of Patent: Oct. 11, 2016

(54) METHOD FOR STARTING-UP A GAS TO LIQUID PROCESS

(71) Applicant: Haldor Topsoe A/S, Kgs. Lyngby (DK)

(72) Inventors: Per Juul Dahl, Vedbæk (DK); Stefan Andersen, Albertslund (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/424,829

(22) PCT Filed: Aug. 15, 2013

(86) PCT No.: PCT/EP2013/067055
§ 371 (c)(1),
(2) Date: Feb. 27, 2015

(87) PCT Pub. No.: WO2014/037201
PCT Pub. Date: Mar. 13, 2014

(65) Prior Publication Data
US 2015/0232763 A1 Aug. 20, 2015

(30) Foreign Application Priority Data

Sep. 5, 2012 (WO) ................ PCT/EP2012/067316

(51) Int. Cl.
*C07C 27/00* (2006.01)
*C10G 2/00* (2006.01)
*C01B 3/50* (2006.01)

(52) U.S. Cl.
CPC . *C10G 2/30* (2013.01); *C01B 3/50* (2013.01); *C01B 2203/04* (2013.01); *C01B 2203/062* (2013.01); *C01B 2203/147* (2013.01)

(58) Field of Classification Search
CPC ..... C10G 2/30; C01B 3/50; C01B 2203/147; C01B 2203/062; C01B 2203/04
USPC .................................................. 518/700, 702
See application file for complete search history.

(56) References Cited

U.S. PATENT DOCUMENTS

| | | | |
|---|---|---|---|
| 2003/0050348 A1* | 3/2003 | Kennedy | C07C 1/0485 518/702 |
| 2007/0231221 A1* | 10/2007 | Aasberg-Petersen | C01B 3/382 422/129 |
| 2010/0022668 A1* | 1/2010 | Allam | C01B 3/382 518/703 |
| 2013/0116347 A1* | 5/2013 | Cheeley | C10K 3/026 518/705 |

FOREIGN PATENT DOCUMENTS

| | | |
|---|---|---|
| WO | WO 2006/099033 A1 | 9/2006 |
| WO | WO 2007/009954 A1 | 1/2007 |
| WO | WO 2009/155554 A2 | 12/2009 |

* cited by examiner

*Primary Examiner* — Jafar Parsa
(74) *Attorney, Agent, or Firm* — Blank Rome LLP

(57) ABSTRACT

The invention relates to a process for starting up a gas-to-liquid process including the production of synthesis gas and a downstream GTL process. The synthesis gas is produced by the use of autothermal reforming (ATR) or catalytic partial oxidation (CPO) and during the starting period the effluent gas from the ATR or CPO is significantly changed to form an off-gas recycle which is fed to the ATR or CPO. When the downstream GTL process is running, the recycle to ATR or CPO is shifted to its off-gas.

19 Claims, 1 Drawing Sheet

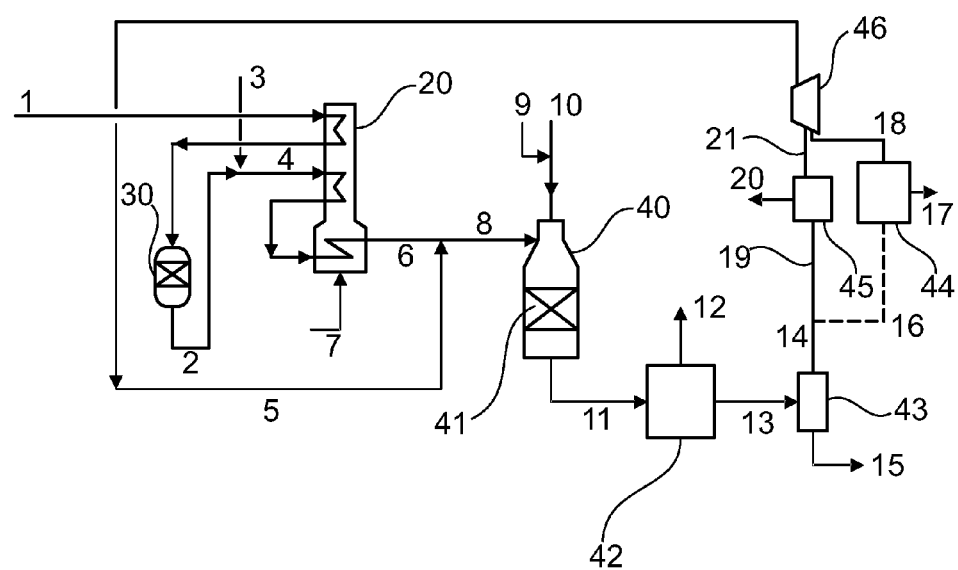

METHOD FOR STARTING-UP A GAS TO LIQUID PROCESS

FIELD OF THE INVENTION

The present invention relates to a process for production of synthesis gas used for the production of liquid hydrocarbons, such as diesel and gasoline. The invention relates in particular to a method for starting up a gas-to-liquid-process (GTL-process) by the use of autothermal reforming or catalytic partial oxidation in which the effluent synthesis gas from the autothermal reformer (ATR) or catalytic partial oxidation reactor (CPO) is dehydrated, depleted from hydrogen and then recycled to the hydrocarbon feedstock of the ATR or CPO.

BACKGROUND OF THE INVENTION

As used herein GTL-process means a process for production of hydrocarbons requiring a $H_2/CO$ molar ratio of 2.3 or below, such as a process for production of diesel via Fischer-Tropsch synthesis in which synthesis gas is converted into liquid hydrocarbons via Fischer-Tropsch reactions, or equivalent process such as a process for production of gasoline in which synthesis gas is first converted to oxygenated compounds in the form of methanol and dimethyl ether (DME) and subsequently to gasoline as disclosed in patents U.S. Pat. No. 4,520,216 and U.S. Pat. No. 4,481,305.

EP-A-0287238 discloses a process under normal operation for the production of hot pressurised hydrogen-containing stream in which a recycle portion of the hot product gas stream from a catalytic partial oxidation reactor is combined with the gas feed in order to preheat the gas fed to the combustion catalyst, thereby enabling easier catalytic combustion. The recycle gas contains not only hydrogen, but also steam.

EP-A-1400489 discloses also a process under normal operation for the production of synthesis gas in which a portion of the effluent from an autothermal reformer is recycled into the hydrocarbon-steam mixture entering the autothermal reformer by means of a thermo-compressor ejector which uses said mixture as motive fluid. The recycle contains not only hydrogen, but also steam to enable soot-free operation of the autothermal reformer and thereby avoid plugging of the catalyst bed.

It is also known to recycle under normal operation a portion of the effluent stream in the form of CO2 from an autothermal reformer into the natural gas fed to the autothermal reformer. The effluent stream from the autothermal reformer is dehydrated first and then passed through a CO2-removal unit in order to form a synthesis gas stream and a CO2-stream. The CO2-stream is recycled and mixed with the natural gas upstream the autothermal reformer.

SUMMARY OF THE INVENTION

As used herein the term "normal operation" means operation under steady-state or quasi steady-state conditions, long after the starting up of the process.

As used herein GTL-process means a process for production of hydrocarbons requiring a $H_2/CO$ molar ratio of 2.3 or below, such as a process for production of diesel via Fischer-Tropsch synthesis in which synthesis gas is converted into liquid hydrocarbons via Fischer-Tropsch reactions, or equivalent process such as a process for production of gasoline in which synthesis gas is first converted to oxygenated compounds in the form of methanol and dimethyl ether (DME) and subsequently to gasoline as disclosed in patents U.S. Pat. No. 4,520,216 and U.S. Pat. No. 4,481,305.

Particularly for Fischer-Tropsch operation the synthesis gas is required to have a $H_2/CO$ molar ratio of 1.7 to 2.3. It is known that these values are compatible with those obtainable when utilizing ATR or CPO in the synthesis gas section while running in continuous operation using recycled off-gas from downstream unit, such as a Fischer-Tropsch synthesis unit, as part of the feed. However, upon the starting up of such processes where this off-gas is not available, the $H_2/CO$ molar ratio is above 2.3 for typical natural gas. Autothermal reforming of standard natural gas with steam/carbon molar ratio of 0.6 typically gives H2/CO molar ratios in the synthesis gas of above 2.4. During normal operation off-gas from Fischer-Tropsch synthesis is mixed with the natural gas feed ensuring a H2/CO molar ratio of below 2.0. The off-gas is recycled from the Fischer-Tropsch synthesis section and combined with the natural gas by use of a recycle compressor.

The present invention encompasses converting during start-up operation hot effluent synthesis gas from the ATR or CPO into an off-gas recycle resembling in volume flow and its effect on synthesis gas H2/CO molar ratio the off-gas from downstream GTL process obtained under normal operation.

During start up, where no Fischer-Tropsch reactions occur in the Fischer-Tropsch synthesis section, it would be desirable to use this recycle compressor to recycle dehydrated synthesis gas from the autothermal reformer or catalytic partial oxidation stage. This reduces the H2/CO molar ratio of the synthesis gas to the required values for downstream Fischer-Tropsch, i.e. values 2.3 or preferably below. However, we have found that the required flow volume of this recycle gas during start up becomes higher than that required during normal operation, thereby forcing the implementation of a higher capacity compressor with attendant high penalty costs. Where several process lines have to be started a higher capacity compressor will be required for each process line.

The invention is a method for starting up that solves the above problems as recited by the following features in accordance with the appended claims:

1. Method for starting up a gas-to-liquid (GTL) process comprising: (a) adding steam to a hydrocarbon feedstock to form a mixture of hydrocarbons and steam, (b) passing said mixture through an autothermal reforming stage (ATR) or catalytic partial oxidation (CPO) stage and withdrawing a stream of hot effluent synthesis gas from the ATR or CPO, (c) removing water from said hot effluent synthesis gas to form a dehydrated synthesis gas, (d) removing at least part of the hydrogen from at least a part of said dehydrated synthesis gas to form an off-gas recycle, (e) directly recycling at least a portion of said off-gas recycle into the hydrocarbon feedstock or into said mixture of hydrocarbons and steam, and (f) subsequently passing at least part of the dehydrated synthesis gas as feed to downstream GTL process while shifting from recycling said off-gas recycle gas to recycling off-gas from said downstream GTL process.
2. Method according to feature 1 wherein step (f) is conducted when the $H_2/CO$ molar ratio of the dehydrated synthesis gas is below 2.3, preferably below 2.2, more preferably below 2.1.

3. Method according to feature 1 or 2 in which said hydrocarbon feedstock is a gas that has passed through at least one pre-reforming stage, preferably an adiabatic pre-reforming stage.
4. Method according to any of features 1-3 in which said hydrocarbon feedstock or said mixture of hydrocarbons and steam are preheated, preferably in a fired-heater, before being combined with said off-gas recycle.
5. Method according to any of features 1-4 in which the off-gas recycle is introduced to the hydrocarbon feedstock or mixture of hydrocarbons and steam by a recycle-compressor.
6. Method according to feature 5 in which the recycle-compressor is an existing recycle-compressor used for recycling off-gas from said downstream gas-to-liquid (GTL) process.
7. Method according to feature 6 in which the off-gas recycle after passing through the recycle-compressor is subjected to a conversion stage for removal of olefins, preferably by hydrogenation.
8. Method according to any of features 1-7 in which said step (d) is conducted in a hydrogen separating membrane or Pressure Swing Separation unit (PSA).
9. Method according to any of features 1-8 in which the steam to carbon molar ratio at which the ATR or CPO is operated is 0.2 to 3.0.
10. Method according to any of features 1-9 in which the stream of hot effluent synthesis gas from the ATR or CPO in step (b) is cooled prior to conducting step (c).
11. Method according to feature 10 in which said hot effluent synthesis gas from the ATR or CPO is cooled in one or more waste heat boilers.
12. Method according to feature 10 in which said hot effluent synthesis gas from the ATR or CPO is used as heat exchanging medium in a heat exchange reformer operated in series or in parallel with the ATR or CPO.
13. Method according to any of features 1-12 in which the gas-to-liquid (GTL) process is Fischer-Tropsch synthesis.

BRIEF DESCRIPTION OF THE FIGURES

The invention is further illustrated by reference to the attached FIGURE which shows a schematic of a specific embodiment of the invention in which recycle gas depleted from hydrogen is used during the starting-up of a GTL process in the form of Fischer-Tropsch synthesis.

DETAILED DESCRIPTION

As used herein the term "autothermal reformer (ATR)" means stand-alone reactors which are fed directly with a hydrocarbon feedstock, or reactors which are fed directly with a pre-reformed hydrocarbon feedstock, or secondary reformers which are reactors fed by primary reformed gas, i.e. reactors using as hydrocarbon feed reformed gas from a primary reformer such as a steam methane reformer (SMR) or heat exchange reformer.

The terms "autothermal reformer (ATR)" and "catalytic partial oxidation" refers also to reactors in which the required heat for the reforming reactions is provided by internal combustion of the hydrocarbon feed with oxygen, air or enriched air that are added to the reactor. The reforming reactions take place in a fixed bed of reforming catalyst arranged downstream in the reactor, with catalytic combustion only taking place in catalytic partial oxidation reactors.

As used herein the terms "water" and "steam" are used interchangeably and refer to the presence of $H_2O$ molecules in a given stream of the process.

As used herein the term "dehydrated synthesis gas" means a synthesis gas from the ATR or CPO from which water has been removed. Since not all water can be removed the dehydrated synthesis gas as used herein contains water in amounts of 1 mol % or less.

As used herein the term "off-gas recycle" means a dehydrated gas from which at least part of the hydrogen has been removed.

Since not all hydrogen can be removed the hydrogen depleted recycle gas is a gas mainly containing CO, CO2 and H2 in concentrations of 1 mol % H2 up to the same H2 content as in the dehydrated synthesis gas. Preferably the hydrogen concentration in the off-gas recycle is 1-75 mol %, more preferably 10-70 mol %, even more preferably 20-65 mol %, most preferably 30-65 mol %, for instance 60 or 63 mol %. The size of the compressor and the required final H2/CO molar ratio decides the degree of required H2 depletion.

As used herein the term "directly recycling at least a portion of said off-gas recycle" means that this gas is recycled immediately without passing through an intermediate stage in which the composition of this gas is further significantly changed.

As used herein the term "steam to carbon molar ratio at which the ATR or CPO is operated" means the ratio of total amount of steam added to the hydrocarbon feed to the ATR or CPO and to oxidant gas entering the ATR or CPO to the amount of carbon molecules fed to the ATR or CPO. Otherwise the term "steam to carbon molar ratio" refers to the ratio of carbon molecules to $H_2O$ molecules in a given stream.

As used herein, the term "off-gas from downstream GTL process" means tail gas from the downstream GTL process, such as Fischer-Tropsch tail gas; such tail gas contains normally carbon monoxide, carbon dioxide, hydrogen, various hydrocarbons including olefins and a range of other components.

During start-up the synthesis gas produced in the ATR or CPO, after water has been removed, is used as recycle gas while no synthesis gas is used for downstream GTL processes. In a specific embodiment in connection with the above or below embodiments step (f) is conducted when the $H_2/CO$ molar ratio of the dehydrated synthesis gas is below 2.3, preferably below 2.2, more preferably below 2.1. Thus, when the required $H_2/CO$ molar ratio of 2.3 or below, more preferably 2.2 or below, most preferably 2.1 or below in the dehydrated synthesis gas is obtained the dehydrated synthesis gas is subsequently passed to the downstream processes, in particular Fischer-Tropsch or equivalent GTL process requiring $H_2/CO$ molar ratios between 1.8 and 2.3, thereby shifting from recycling off-gas recycle to recycling off-gas from said downstream process. The higher the $H_2/CO$ molar ratio of the dehydrated synthesis gas at end of start-up, the more off-spec product (product outside required specifications) and off-gas from downstream GTL process will be produced. As a result the control of the overall process, i.e. reforming and downstream GTL process, becomes more difficult.

In a specific embodiment in connection with one or more of the above or below embodiments, said hydrocarbon feedstock is a gas that has passed through at least one pre-reforming stage. Preferably the hydrocarbon feedstock is natural gas where higher hydrocarbons than methane are normally present. In the pre-reforming stage, all higher hydrocarbons (C2+) are converted into a mixture of carbon oxides, hydrogen and methane. The pre-reforming stage gives flexibility to the process as hydrocarbon feedstocks of varying compositions can be handled, such as different types of natural gas feeds to heavy naphta. Preferably the pre-reforming stage is conducted in an adiabatic pre-reformer containing a fixed bed of reforming catalyst. Where a pre-reforming stage is used, the steam-to-carbon ratio of the pre-reformed gas, in accordance with the above mentioned range of steam to carbon molar ratio, is preferably 0.2 to 3.0, more preferably 0.3 to 1.0, even more preferably 0.4-0.8, most preferably 0.5 or 0.6.

In a specific embodiment in connection with one or more of the above or below embodiments, said hydrocarbon feedstock or said mixture of hydrocarbons and steam are preheated, preferably in a fired-heater, before being combined with said off-gas recycle. Thus, opposite to situations where e.g. CO2-gas may be recycled and added upstream a pre-heater in normal operations, the off-gas recycle according to the present invention is added downstream the pre-heater, which is preferably a fired-heater. This enables protection of the fired-heater and thereby longer lifetime of this unit.

In another specific embodiment in connection with one of the above or below embodiments, the off-gas recycle is introduced to the hydrocarbon feedstock or the mixture of hydrocarbons and steam by a recycle-compressor. Preferably the recycle-compressor is an existing recycle-compressor used for recycling off-gas from downstream gas-to-liquid (GTL) process, more preferably from Fischer-Tropsch synthesis. This enables in an efficient and inexpensive manner to conduct the overall process as no additional capital investments are required to provide the recycle and to switch from a start up mode into a normal operation mode.

It would be understood that during normal (continuous) operation of the downstream process, such as a Fischer-Tropsch plant, dehydrated synthesis gas is normally passed through Fischer-Tropsch synthesis for production of liquid hydrocarbons. Off-gas (tail gas) gas from this synthesis is recycled to the reforming section of the plant via a dedicated recycle-compressor. By the present invention such recycle-compressor can be used during start-up of the plant by passing the off-gas recycle during start-up operation directly through the recycle-compressor. This conveys advantages not only in terms of capital costs since there is no need for an expensive separate compressor dedicated only to handle a recycle gas stream during start-up, particularly if there are several process lines, but also a better process economy due to more stable operation of the burner in the autothermal reformer: under normal operation, off-gas from downstream process is normally passed through the recycle compressor and thereafter to the reforming section of the plant. Such off-gas may for instance be sent to the ATR and thus the ATR-burner design is adapted to the use of such gas. During start-up such off-gas has been "replaced" by a similar gas in the form of the off-gas recycle and which is passed via the existing recycle-compressor, i.e. recycle-compressor used under normal operation. As such the ATR-burner is already during start-up adapted to the design conditions including volume flow that it later will confront in the off-gas during normal operation. There is no need to adapt or redesign the ATR-burner for start-up operations.

In another specific embodiment in connection with one or more of the above embodiments, the off-gas recycle after passing through the recycle-compressor is subjected to a conversion stage for removal of olefins, preferably by hydrogenation.

In another specific embodiment in connection with one or more of the above embodiments, the step (d) of removing at least part of the hydrogen from said dehydrated synthesis gas to form the off-gas recycle is conducted in a hydrogen separating membrane or Pressure Swing Separation unit (PSA), preferably in a hydrogen separating membrane as this unit supports off-gas operation at higher pressures than PSA and thus enables a more flexible operation, particularly where the compressor has to be operated at higher pressures such as 20-40 atm or higher, due to for instance the need of a high operating pressure in the ATR.

Where several process lines are to be started-up the invention enables the provision of e.g. a single hydrogen removal unit in the recycle without needing to increase the capacity of each recycle compressor in each process line.

In a specific embodiment in connection with one of the above or below embodiments and in accordance with above mentioned ranges of steam to carbon molar ratios, the steam to carbon molar ratio at which the ATR or CPO is operated is 0.2 to 3.0, preferably at 0.3 to 1.0, more preferably 0.4-0.8, most preferably 0.5 or 0.6. The lower the steam to carbon molar ratio the better the process economy, since less steam has to be carried through the plant and thereby equipment size can be reduced.

In a specific embodiment in connection with one or more of the above or below embodiments, the stream of hot effluent synthesis gas from the ATR or CPO in step (b) is cooled prior to conducting step (c). Hence, prior to removing water from said hot effluent synthesis gas from the ATR or CPO, the synthesis gas is cooled, preferably by passing the synthesis gas through a cooling train of waste heat boilers and optionally steam superheaters. Since the temperature of the effluent synthesis gas is normally about 1000° C., the waste heat boilers enable heat recovery for steam production to be used in the process, and prepare the synthesis gas for subsequent dewatering in e.g. a knock-off drum before being passed through the recycle-compressor.

In a specific embodiment in connection with one or more of the above or below embodiments, the hot effluent synthesis gas is used as heat exchanging medium in a heat exchange reformer operated in series or in parallel with the ATR or CPO. This enables that a higher process economy be achieved, since the hot effluent gas at e.g. about 1000° C. can be used to drive the catalytic reforming reactions in the heat exchange reformer.

In a specific embodiment in connection with anyone of the above embodiments, the gas-to-liquid (GTL) process is preferably Fischer-Tropsch synthesis, or a process for production of gasoline in which synthesis gas is first converted to oxygenated compounds in the form of methanol and dimethyl ether (DME) and subsequently to gasoline.

The accompanying FIGURE shows a schematic of a specific embodiment of the invention. Natural gas stream 1 is pre-heated in fired heater 20 using fuel 7 as energy source and then passed through desulphurisation unit 30. The desulfurized natural gas 2 is mixed with steam 3 to form a mixture of hydrocarbons and steam 4 which is then pre-heated in same fired heater 20 and subsequently combined with off-gas recycle stream 5. The combined stream 8 is passed to autothermal reformer (ATR) 40 containing a fixed bed of catalyst 41. Steam 9 is mixed with oxygen or enriched air 10 (>44 mole % oxygen) and added to the ATR 40. The hot effluent synthesis gas 11 from the ATR leaves at about 1000° C. and is then passed through a cooling train 42 of waste heat boilers under the production of steam 12 to be used in the process. The cooled synthesis gas 13 is then passed to a knock-off drum 43 to remove water as condensate 15 thereby creating dehydrated synthesis gas 14. During start-up the dehydrated synthesis gas is passed to hydrogen removal unit in the form of hydrogen membrane 45 where hydrogen stream 20 is removed. At least a portion of the off-gas recycle 21 is directly recycled via existing (used during normal operation) recycle-compressor 46 into the heated mixture of hydrocarbons and steam 6. During start-up of the plant the H2/CO molar ratio of dehydrated syngas 14 is high, for instance 2.5 or 2.4 so that synthesis gas line 16 for the downstream process will be shut down. After establishing an appropriate $H_2$/CO molar ratio of 2.3 or below, normal operation is gradually initiated by which the synthesis gas line 16 is opened, and downstream Fischer-Tropsch synthesis 44 conducted. This synthesis results in liquid hydrocarbons 17 and off-gas stream 18 which is recycled to the reforming section of the plant via existing recycle compressor 46.

EXAMPLE

Table 1 and 2 with reference to the accompanying FIGURE summarises the effect of removing part of the hydrogen from the dehydrated recycle gas during start-up. The example is given for fixed pre-reformed gas flow. Without recycle the H2/CO ratio is 2.46. In the two cases the H2/CO ratio in the ATR effluent stream is adjusted to 2.25 by recycling dehydrated synthesis gas or off-gas recycle from a hydrogen removal unit, here a hydrogen membrane unit. A hydrogen stream of 4317 Nm3/H (99.62 mol % H2) is removed in the hydrogen membrane case. It is seen that removing this part of the hydrogen from the dehydrated recycle gas reduces the required recycle flow from 113890 Nm3/h to 84269 Nm3/h clearly illustrating the effect of the invention. In terms of flow (Nm3/h), the amount of hydrogen that is recycled is reduced by 28% with respect to the Base Case (without H2 removal unit). The effective reduction in hydrogen in the recycle flow is a factor 4.6 higher than the actual hydrogen removal. The size of the membrane can therefore be kept small and therefore less costly. The reduced volume flow of the off-gas recycle is adjusted to be similar as the off-gas from downstream Fischer-Tropsch under normal operation.

Therefore there is no need for additional costs in terms of a higher capacity recycle-compressor for the start-up case. The overall effect is a cost saving in the hydrogen membrane case.

Furthermore, as the ratio between reformed gas and recycle gas is closer to normal operation in the hydrogen membrane case the conditions for the design of the ATR burner is eased, which will have positive impact on burner lifetime and therefore burner cost.

The H2/CO ratio can easily be further reduced by removing more hydrogen. This can be an advantage for a downstream GTL unit, reducing start-up time and reducing the amount of off-spec products.

TABLE 1

Base case (start-up without hydrogen membrane)

| | Stream | | | | | | | | |
|---|---|---|---|---|---|---|---|---|---|
| | Dehydrated Syngas Recycle, 5 | | Pre-reform. Gas, 6 | | ATR Effluent, 11 | | Oxygen to ATR, 10 | | Steam to ATR, 9 |
| Comp. | Nm³/h | mol % | Nm³/h | mol % | Nm³/h | mol % | Nm³/h | Mol % | Nm³/h | mol % |
| Ar | 128 | 0.11 | | | 427 | 0.09 | 299 | 0.50 | | |
| CH₃OH | 490 | 0.43 | | | | | | | | |
| CH₄ | 1520 | 1.33 | 92826 | 62.24 | 5054 | 1.08 | | | | |
| CO | 32345 | 28.40 | 26 | 0.02 | 108300 | 23.13 | | | | |
| CO₂ | 10205 | 5.51 | 1664 | 1.22 | 21789 | 4.65 | | | | |
| H₂ | 72050 | 63.27 | 7789 | 5.22 | 243677 | 52.04 | | | | |
| N₂ | 380 | 0.33 | 889 | 0.60 | 1293 | 0.28 | | | | |
| O₂ | | | | | | | 59414 | 99.5 | | |
| H₂O | 704 | 0.62 | 45941 | 30.80 | 87710 | 18.73 | | | 9953 | 100 |
| Total | 113890 | 100 | 149145 | 100 | 468250 | 100 | 59713 | 100 | 9953 | 100 |

TABLE 2

H2 membrane case (start-up with H2 membrane)

| | Stream | | | | | | | | |
|---|---|---|---|---|---|---|---|---|---|
| | Off-gas recycle from H2 membrane, 5 | | Pre-reform. Gas, 6 | | ATR Effluent, 11 | | Oxygen to ATR, 10 | | Steam to ATR, 9 |
| Comp. | Nm³/h | mol % | Nm³/h | mol % | Nm³/h | mol % | Nm³/h | mol % | Nm³/h | Mol % |
| Ar | 95 | 0.11 | | | 386 | 0.09 | 291 | 0.50 | | |
| CH₃OH | 362 | 0.43 | | | | | | | | |
| CH₄ | 1121 | 1.33 | 92825 | 62.24 | 4514 | 1.03 | | | | |
| CO | 24594 | 29.18 | 26 | 0.02 | 100805 | 22.99 | | | | |
| CO₂ | 5557 | 6.59 | 1663 | 1.12 | 20829 | 4.75 | | | | |
| H₂ | 52248 | 62.01 | 7792 | 5.22 | 226811 | 51.74 | | | | |
| N₂ | 292 | 0.35 | 897 | 0.60 | 1203 | 0.27 | | | | |
| O₂ | | | | | | | 57909 | 99.5 | | |
| H₂O | | | 45938 | 30.80 | 83846 | 19.13 | | | 9703 | 100 |
| Total | 84269 | 100 | 149141 | 100 | 438394 | 100 | 58200 | 100 | 72880 | 100 |

The invention claimed is:

1. Method for starting up a gas-to-liquid (GTL) process comprising:
   (a) adding steam to a hydrocarbon feedstock to form a mixture of hydrocarbons and steam,
   (b) passing said mixture through an autothermal reforming stage (ATR) or catalytic partial oxidation (CPO) stage and withdrawing a stream of hot effluent synthesis gas from the ATR or CPO,
   (c) removing water from said hot effluent synthesis gas to form a dehydrated synthesis gas,
   (d) removing at least part of the hydrogen from at least a part of said dehydrated synthesis gas to form an off-gas recycle,
   (e) directly recycling at least a portion of said off-gas recycle into the hydrocarbon feedstock or into said mixture of hydrocarbons and steam, and
   (f) subsequently passing at least part of the dehydrated synthesis gas as feed to downstream GTL process while shifting from recycling said off-gas recycle gas to recycling off-gas from said downstream GTL process.

2. Method according to claim 1 wherein step (f) is conducted when the H2/CO molar ratio of the dehydrated synthesis gas is below 2.3.

3. Method according to claim 1 in which said hydrocarbon feedstock is a gas that has passed through at least one pre-reforming stage.

4. Method according to claim 1 in which said hydrocarbon feedstock or said mixture of hydrocarbons and steam are preheated before being combined with said off-gas recycle.

5. Method according to claim 1 in which the off-gas recycle is introduced to the hydrocarbon feedstock or mixture of hydrocarbons and steam by a recycle-compressor.

6. Method according to claim 5 in which the recycle-compressor is an existing recycle-compressor used for recycling off-gas from said downstream gas-to-liquid (GTL) process.

7. Method according to claim 6 in which the off-gas recycle after passing through the recycle-compressor is subjected to a conversion stage for removal of olefins.

8. Method according to claim 1 in which said step (d) is conducted in a hydrogen separating membrane or Pressure Swing Separation unit (PSA).

9. Method according to claim 1 in which the steam to carbon molar ratio at which the ATR or CPO is operated is 0.2 to 3.0.

10. Method according to claim 1 in which the stream of hot effluent synthesis gas from the ATR or CPO in step (b) is cooled prior to conducting step (c).

11. Method according to claim 10 in which said hot effluent synthesis gas from the ATR or CPO is cooled in one or more waste heat boilers.

12. Method according to claim 10 in which said hot effluent synthesis gas from the ATR or CPO is used as heat exchanging medium in a heat exchange reformer operated in series or in parallel with the ATR or CPO.

13. Method according to claim 1 in which the gas-to-liquid (GTL) process is Fischer-Tropsch synthesis.

14. Method according to claim 2 wherein the $H_2/CO$ molar ratio of the dehydrated synthesis gas is below 2.2.

15. Method according to claim 14 wherein the $H_2/CO$ molar ratio of the dehydrated synthesis gas is below 2.1.

16. Method according to claim 7 in which the off-gas recycle after passing through the recycle-compressor is subjected to hydrogenation.

17. Method according to claim 3 in which said at least one pre-reforming stage is preferably an adiabatic pre-reforming stage.

18. Method according to claim 4 in which said hydrocarbon feedstock or said mixture of hydrocarbons and steam are preheated in a fired-heater before being combined with said off-gas recycle.

19. Method for starting up a gas-to-liquid (GTL) process comprising:
   (a) adding steam to a hydrocarbon feedstock to form a mixture of hydrocarbons and steam,
   (b) passing said mixture through an autothermal reforming stage (ATR) or catalytic partial oxidation (CPO) stage and withdrawing a stream of hot effluent synthesis gas from the ATR or CPO,
   (c) removing water from said hot effluent synthesis gas to form a dehydrated synthesis gas,
   (d) during start-up, removing at least part of the hydrogen from at least a part of said dehydrated syntheses gas to form an off-gas recycle having a H2/CO molar ratio of the dehydrated synthesis gas below 2.3,
   (e) directly recycling at least a portion of said off-gas recycle into the hydrocarbon feedstock or into said mixture of hydrocarbons and steam, and
   (f) subsequently passing at least part of the dehydrated synthesis gas as feed to downstream GTL process while shifting from recycling said off-gas recycle gas to recycling off-gas from said downstream GTL process.

* * * * *